Dec. 24, 1940.　　　G. MESAROS　　　2,226,065
FISH LURE
Filed Dec. 3, 1938
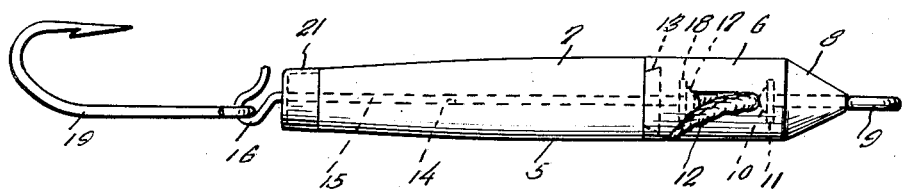
Fig. 1.
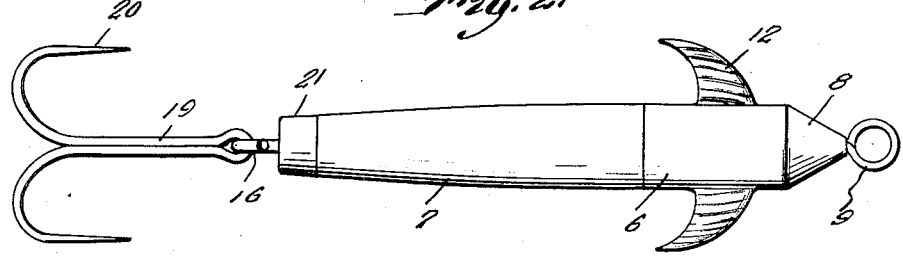
Fig. 2.
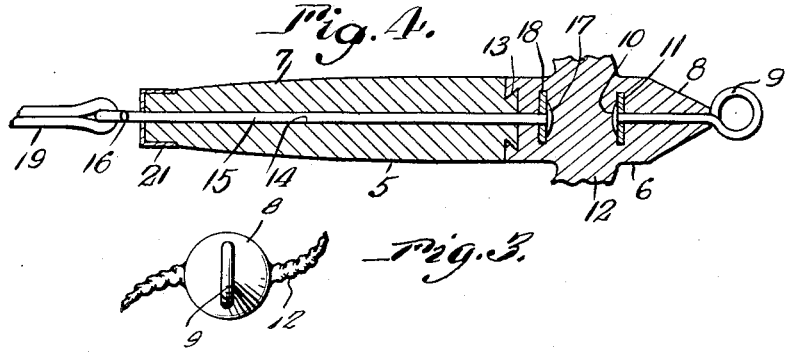
Fig. 4.
Fig. 3.
Inventor
George Mesaros
By Clarence A. O'Brien
and Hyman Berman
Attorneys Patented Dec. 24, 1940

2,226,065

UNITED STATES PATENT OFFICE 2,226,065

FISH LURE

George Mesaros, Linden, N. J.

Application December 3, 1938, Serial No. 243,844

2 Claims. (Cl. 43—47)

The present invention relates to fish lures of a type designed for use for trolling purposes, and embodies a substantially elongated cylindrical body portion having fins projecting outwardly from the sides adjacent its forward end to produce a rotary movement of the body and forming the body portion rearwardly of its front end of a composition material capable of being formed in different colors to suit circumstances under which the lure is used.

A further object is to provide novel means for attaching the composition body portion to the forward or head portion of the plug and also for attaching a swivel line attaching eye at the forward end and a swivel hook attaching member at the rear end of the plug.

A still further object is to provide a device of this character of simple and practical construction, which is durable, relatively inexpensive to manufacture and otherwise well adapted for the purposes for which the same is intended.

Other objects and advantages reside in the details of construction as more fully hereinafter described and claimed, reference being had to the accompanying drawing forming part hereof, wherein like numerals refer to like parts throughout, and in which—

Figure 1 is a side elevational view.

Figure 2 is a top plan view.

Figure 3 is a front end elevational view, and

Figure 4 is a longitudinal sectional view.

Referring now to the drawing in detail, the invention comprises a plug designated generally at 5 which is of elongated tapering cylindrical form and including a head portion 6 and body portion 7. The head portion 6 is constructed of lightweight metal, such as tin or the like, and has its forward end tapered as shown at 8. Extending through the tip of the forward end is an eye 9 having its inner end terminating in a head 10 engaged against a washer 11 to facilitate the swivel movement of the eye.

Projecting laterally from opposite sides of the head portion are fins 12 which are curved substantially in the form as shown in Figures 1 and 3 to produce a rotary movement of the plug when drawn through the water.

The body portion 7 is preferably formed of a composition material, such as Catalin, and is of a solid construction with its forward end formed of a reduced flared extension 13 imbedded in the rear end of the head portion 6, as more clearly illustrated in Figure 1 of the drawing, to firmly anchor the head portion to the body portion for rotation as a unit. The body portion 7 is formed with a longitudinally extending bore 14 through which the shank portion 15 of a hook 16 is rotatably inserted, the inner end of the shank being formed with a head 17 engaging a washer 18 positioned in the head portion 6 to facilitate rotation of the hook. The hook 16 is secured to a fish-hook 19 which may embody a plurality of hooked members 20, as shown in Figure 2.

A brass ferrule 21 is positioned on the rear end of the body to protect the same from injury while changing the hook 19.

It is believed the details of construction and manner of use of the device will be readily understood from the foregoing without further detailed explanation.

Having thus described the invention, what I claim is—

1. A fish lure comprising a cylindrical elongated plug including a head portion and a body portion, said head portion being constructed of metal and said body portion being constructed of a composition of material and provided with a longitudinally extending bore, said head having washers embedded therein, a fish-hook attaching member swivelly mounted in said bore and having one end swivelly anchored in the head portion, and provided with an enlargement bearing against one of the washers to prevent withdrawal of the member from the head, and a line attaching member swivelly mounted in the tip end of said head portion and also having one end swivelly anchored in said head portion and provided with an enlargement bearing against the other of said washers to prevent withdrawal of said last named member from the head.

2. A fish lure comprising a cylindrical elongated plug including a metallic head portion and a composition body portion, said head having a recess at its rear end provided with a restricted opening and said body portion having a reduced flared extension imbedded in the recess of the head portion and fixedly secured thereto, a line attaching eye swivelly attached to the tip of the head portion, a hook swivelly attached to the body portion, said eye and said hook being swivelly anchored in the head portion, and fins projecting laterally from said head portion.

GEORGE MESAROS.